June 15, 1937.  E. W. LARSEN  2,084,149
APPARATUS FOR EXTRUDING MATTER
Filed Oct. 12, 1932  3 Sheets-Sheet 2
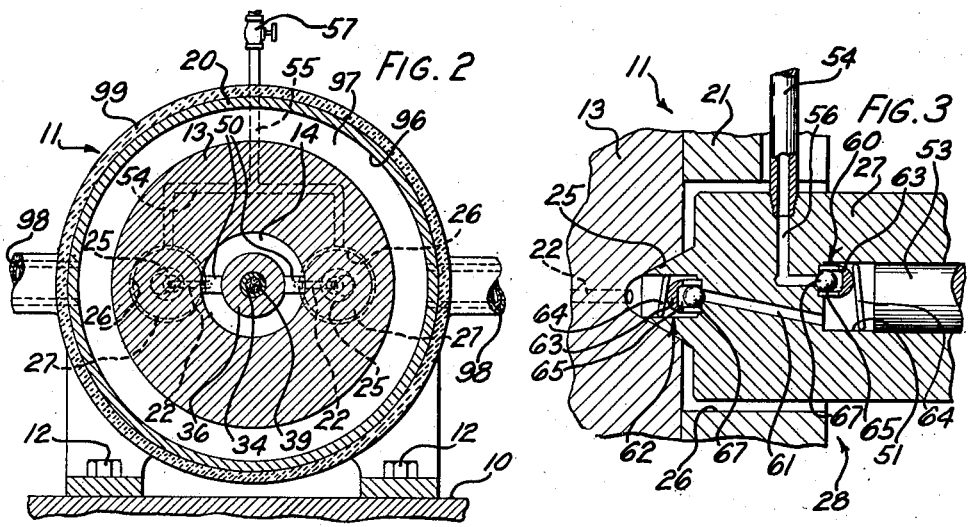
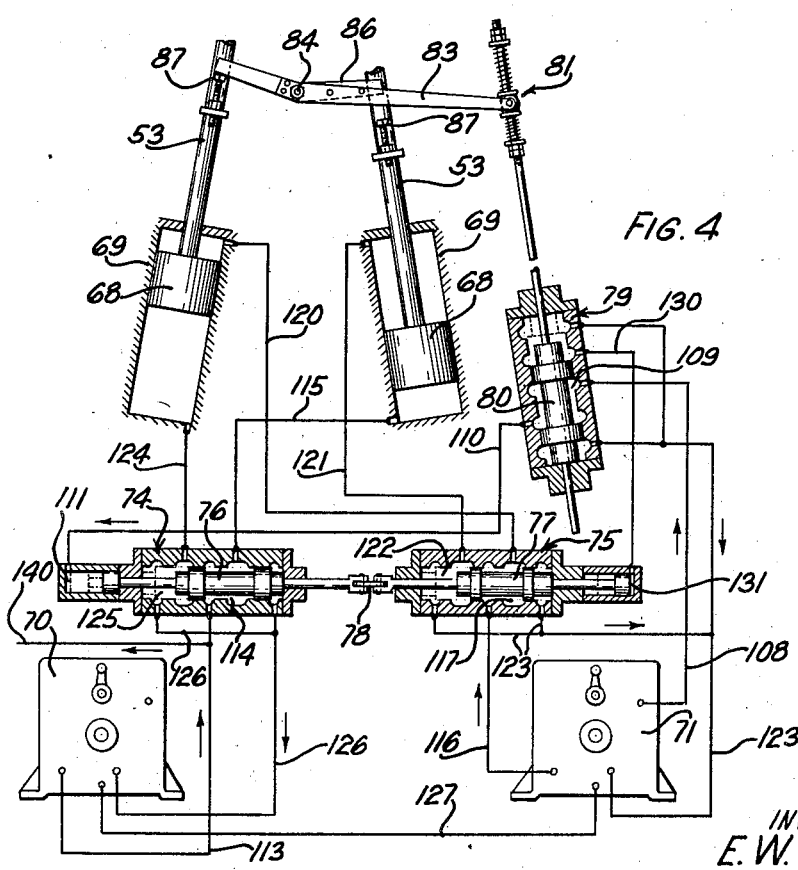
INVENTOR
E. W. LARSEN
BY H. A. Whitehorn
ATTORNEY

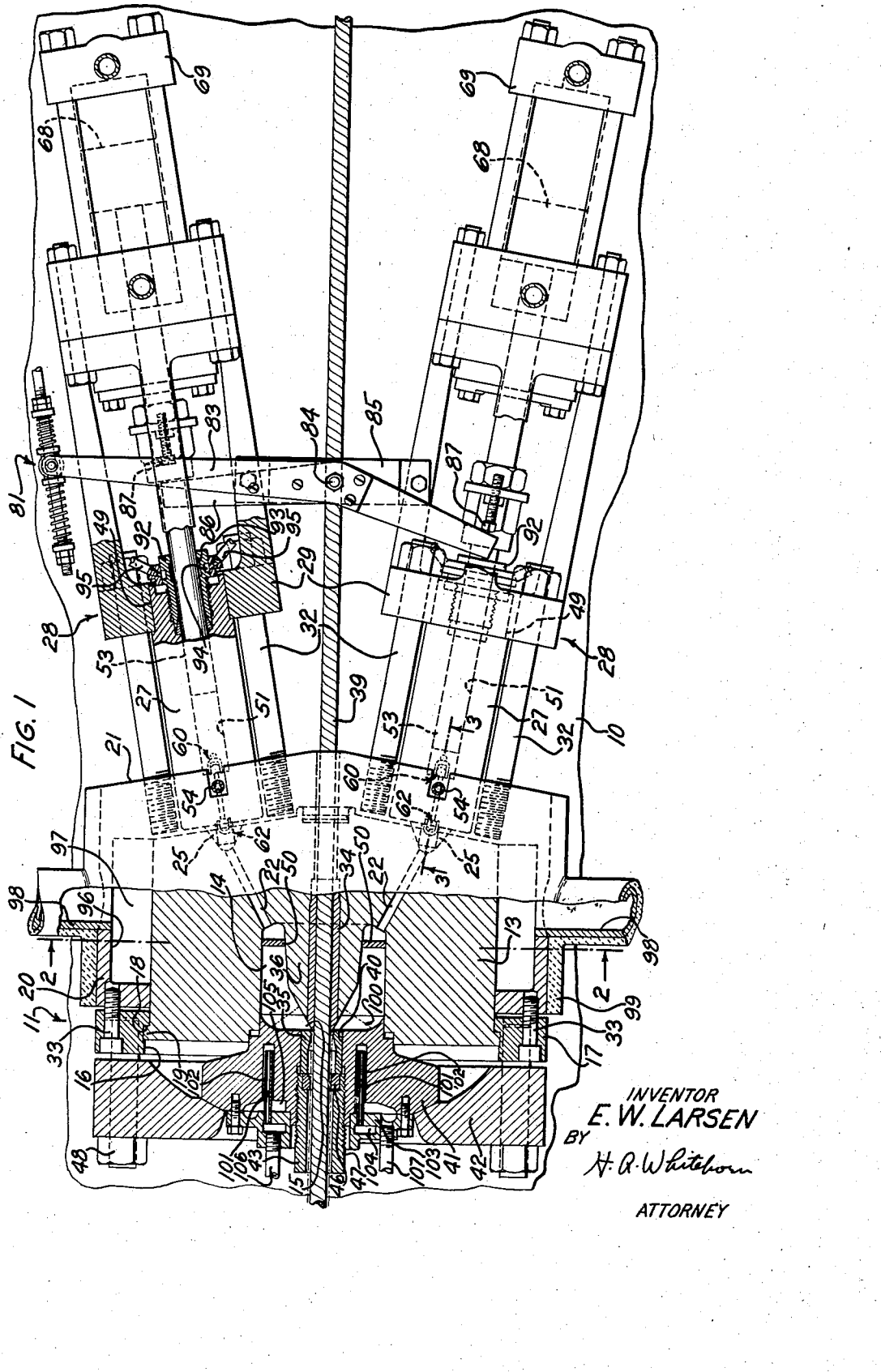

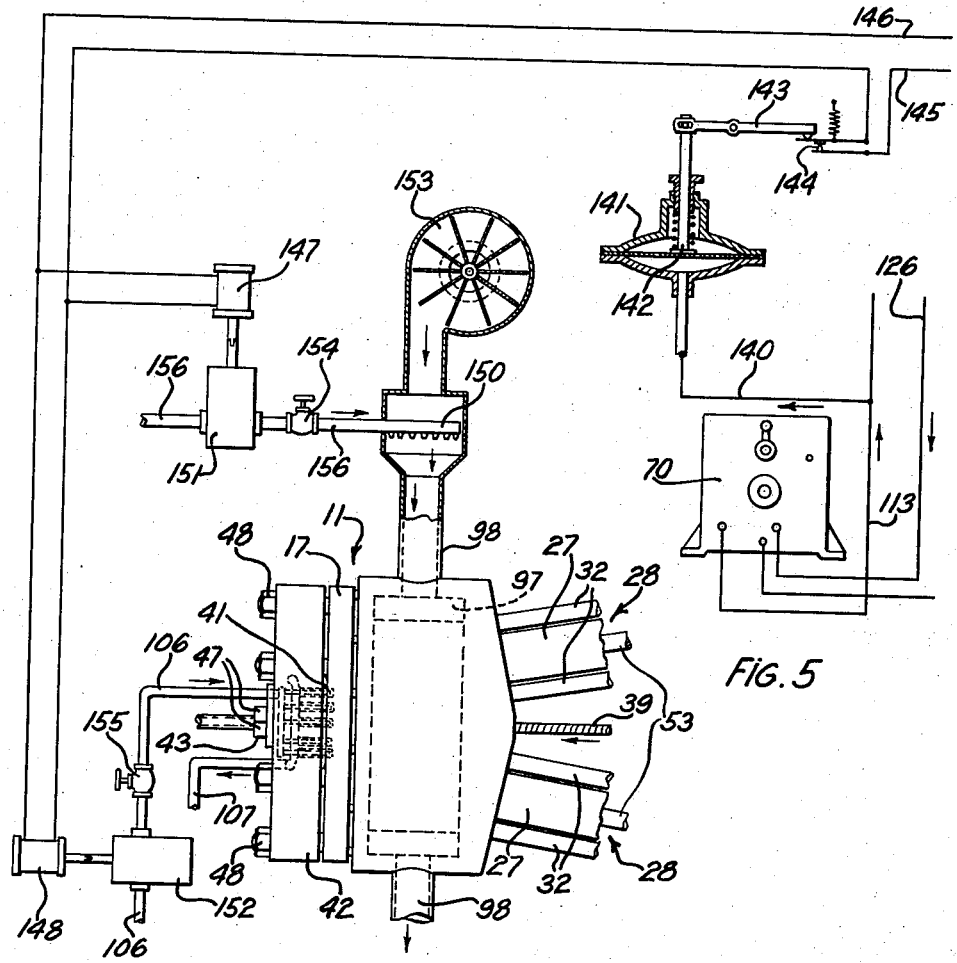

Patented June 15, 1937

2,084,149

UNITED STATES PATENT OFFICE 2,084,149

APPARATUS FOR EXTRUDING MATTER

Einer W. Larsen, Chicago, Ill., assignor to Western Electric Company, Incorporated, New York, N. Y., a corporation of New York Application October 12, 1932, Serial No. 637,465

18 Claims. (Cl. 207—4)

This invention relates to apparatus for extruding matter, and more particularly to apparatus for continuously extruding a metallic sheath around a cable or core in strand form.

An object of the invention is to provide an improved apparatus for continuously extruding matter.

Another object of the invention is to provide an improved apparatus for continuously sheathing cables or cores in strand form.

One form of apparatus embodying the features of the invention comprises a plurality (preferably two) of hydraulically actuated piston type extrusion pumps arranged to receive matter to be extruded from a supply thereof and discharge the same into a common extruding chamber. The hydraulic circuit for actuating the pumps is arranged so that the forward strokes of the pistons overlap each other and the hydraulic pressure for the forward strokes of all pistons is supplied by a single constant delivery pump, whereby the sum of the forward stroke displacement rates of the pistons is always uniform. Thus, the matter to be extruded is continuously forced into the extruding chamber at a constant rate and consequently the matter at the discharge end of the chamber is continuously extruded through the die at a constant rate. This arrangement and method of driving the extrusion pumps permits the rate of extrusion to be readily and conveniently controlled by simply regulating the displacement of the constant delivery pump. Also, it permits the regulation of the temperature of the matter within the extruding chamber from the extruding pressure. Furthermore, it permits the convenient and accurate regulation of extruding pressure, as by means of safety or relief valves, whereby the extruding pressure is positively prevented from exceeding a predetermined safe limit so as not to build up disruptive stresses within the extrusion chamber.

The invention further contemplates means for maintaining the matter within the extruding chamber in a liquid state until very near the extrusion point, whereby the extruding pressure may be reduced to a practicable minimum.

Other features and advantages of this invention will more fully appear from the following detailed description taken in connection with the accompanying drawings, in which Fig. 1 is a fragmentary plan view, partly in section, of an extruding apparatus which embodies the invention;

Fig. 2 is a transverse vertical section, on a reduced scale, taken on the line 2—2 of Fig. 1;

Fig. 3 is a fragmentary detail section, on an enlarged scale, taken on the line 3—3 of Fig. 1;

Fig. 4 is a diagrammatic view of the hydraulic circuit for controlling and operating the extrusion pumps;

Fig. 5 illustrates diagrammatically a mechanism for controlling the temperature of the matter within the extruding chamber, and Fig. 6 illustrates diagrammatically an alternative form of mechanism for controlling the temperature of the matter being extruded.

The apparatus illustrated in the drawings and hereinafter described is particularly applicable for applying a lead alloy sheath to cable cores.

Referring to Figs. 1 and 2, the reference character 10 designates a base plate, shown fragmentarily, upon which is mounted at one end an extrusion head, indicated generally by the reference character 11, the head being rigidly secured to the base plate by bolts 12. The head 11 comprises a tubular block 13 provided with an axially arranged annular extrusion chamber 14, which is contracted at its left end to form a discharge opening 15. Shrunk, as indicated at 16, onto the front end of the block 13 is a ring 17, an inner annular surface 18 of which abuts an outer annular surface of a peripheral flange 19 formed on the block (Fig. 1). Surrounding the block 13 at the right of the ring 17 is a one piece housing 20 provided with a back wall 21. The extrusion chamber 14 at its right or inlet end communicates by means of passages 22 with a pair of diametrically opposed tapered depressions 25 formed in the right end wall of the block 13 (Fig. 2). The depressions 25 are aligned with similarly arranged openings 26 provided in the back wall 21 of the housing 20 and which freely receive cylinders 27 of a pair of pumps 28 for supplying the annular extrusion chamber 14 with the matter or alloy to be extruded, the forward ends of the cylinders being reduced and tapered to fit the tapered depressions 25 of the block 13. The longitudinal axes of the pumps 28 are inclined at equal angles to the axis of the extrusion chamber 14, the right end wall of the block 13 and the end wall 21 of the housing 20 abutting therewith, and which have formed therein the depressions 25 and openings 26, respectively, for receiving the cylinders 27 of the pumps, being arranged perpendicular to the pump axes.

Supporting frames 29 of the pumps 28 are secured to the back wall 21 of the housing 20 by a plurality of bolts 32, while the housing 20 is secured to the ring 17 by a plurality of screws 33. At their right ends the frames 29 are supported on I-beams (not shown) secured to the base plate 10. With this construction for supporting the pumps 28 in operative relation with the extrusion block 13, it will be observed that there is no necessity for any screw threaded apertures for screws or bolts in the extrusion block.

This results in an extrusion block having a maximum resistance to disruptive stresses during the extruding operation.

The discharge opening 15 of the extrusion chamber 14 has associated therewith a core tube 34 and a die 35. The core tube 34 is rigidly secured axially of the chamber 14 in a sleeve 36 formed integral with the block 13, the inner diameter of the core tube being substantially the diameter of a cable core 39 to be sheathed and which in the operation of the apparatus is drawn through an opening in the back wall 21 of the housing 20, an aligned opening in the block 13 and then through the core tube and the die 35.

The die 35 is slidably carried and accurately fitted without any lateral play in a shouldered aperture 40 in a die holder 41 interposed between the block 13 and a clamping ring 42, the die holder being outwardly shouldered at its inner end and fitted into cooperating inner shoulders at the forward end of the block thus forming the left end wall of the extrusion chamber 14. Abutting the left end of the die is an adjustable sleeve 43 threadedly carried in the die holder 41, the inner end of the sleeve being fitted with a cable guiding ring 46 having an internal diameter corresponding to the diameter of the sheathed cable. At its outer end the sleeve 43 is provided with a plurality of flattened faces 47 adapted to receive a wrench, which may be used to rotate and thereby adjust the sleeve longitudinally in the die holder 41. A movement inwardly of the sleeve 43 will slide the die 35 in a similar direction and thereby reduce the distance between the cooperating opposed end faces of the die and the core tube 34 which space forms the discharge opening 15 of the extrusion chamber 14. An outward movement of the sleeve 43 will permit the die 35 to follow, through the thrust thereagainst of matter or alloy being extruded at the discharge opening 15, and thereby increase the size of the discharge opening. This permits the operator to control the cross-sectional area of alloy sheath being extruded through the discharge opening 15 and around the cable core 39. The clamping ring 42 is secured to the ring 17 by a plurality of bolts 48, the ring 17 as hereinbefore described, being shrunk onto the block 13. Wedged or otherwise suitably secured in the extrusion chamber 14 between the outer and inner peripheries of the sleeve 36 and the block 13, respectively, and in front of the outlet ends of the passages 22 is a pair of rectangular plates 50 (Fig. 2). The plates 50 serve to diffuse the incoming molten alloy around the extrusion chamber 14 thereby causing the alloy to move uniformly toward the discharge opening 15.

Since the axis of the die 35 is coincident with the axis of the core tube 34, and the molten alloy is uniformly disposed around the discharge opening 15 it follows that any alloy extruded therethrough will form a sheath of uniform thickness around the cable core 39. The cable core 39, of course, will be drawn by the lead sheath through the apparatus at a rate of speed equal to the rate of speed at which the alloy is extruded between the core tube and the die.

The annular extrusion chamber 14 is continuously supplied with alloy to be extruded, the alloy being forced into the chamber under a constant and sufficient pressure to cause it to be extruded between the core tube 34 and the die 35 by means of the pumps 28 arranged as hereinbefore described. Each of the cylinders 27 of the pumps 28 is reduced in diameter at its right end and fits within an aperture in the supporting frame 29. The cylinders 27 are each provided with a central longitudinal bore 51 extending from the right end of the cylinder to a point adjacent the left end thereof (Figs. 1 and 3) within which is slidably journaled a plunger 53 adapted to be reciprocated therein so that it may force the alloy, to be extruded, into the annular extrusion chamber 14. The alloy to be extruded is supplied to the cylinders 27 by way of a common manifold 54 (Fig. 2) which is connected by means of a pipe 55 to a suitable receptacle or supply source (not shown) provided with means to keep the alloy in a fused state so that it may gravitate by way of the pipe 55, manifold 54, and inlet passages 56, formed in the left end of each of the cylinders, to the bores 51 thereof. A valve 57 disposed in the pipe 55 provides means whereby the operator may shut off the flow of fused alloy to the cylinders 27.

To prevent a back flow of the fused alloy from the cylinders 27 through the passages 56 and into the common manifold 54, valve devices 60 are provided at the inlet port of each cylinder bore 51 at the inner end of its associated passage 56 (Fig. 3). The discharge port at the inner end of an outlet passage 61, which communicates with the extrusion chamber 14 by way of the passage 22, is also provided with a valve device 62 for preventing a back flow of the alloy from the chamber 14. It will be noted that the inlet and discharge ports and their respective valve devices 60 and 62 are arranged substantially parallel to the axis of the associated cylinder bore 51. Also, both ports are formed in the forward end wall of the cylinder and do not enter the side walls of the cylinder bore.

This arrangement of the inlet and outlet ports of the cylinder bores 51, it will be apparent, provides an economical cylinder construction which reduces concentrated stresses in the cylinder. In the particular arrangement shown in the drawings the inlet port is offset with respect to the axis of the cylinder bore 51 and the outlet port is coincident therewith at its outer end with its inner end offset similar to the inlet port.

Each of the valve devices 60 and 62 comprises a valve cage 63 mounted in the cylinder at its respective port. A length of drill rod 64 is wedged in the cylinder bore 51 and against the closed end wall of the cage 63 to secure the same in position. Each of the valve cages 63 is provided with a central aperture 65 through which the fused alloy must pass on its way into or out of the cylinder bore 51. Disposed axially within the apertures 65 of the valve cages 63 and reciprocable longitudinally thereof are balls 67 adapted to engage valve seats formed in the inlet and outlet ports at the inner ends of the passages 56 and 61.

From the foregoing detailed description of the pumps 28, it is apparent that if one of the plungers 53 is reciprocated in its cylinder 27, there will be an intermittent flow of fused alloy from the supply receptacle (not shown) through the cylinder, and thence into the annular extrusion chamber 14, the valve devices 60 and 62 acting to control the flow of fused alloy to and from the cylinder 27.

In accordance with a feature of the present invention, the pumps 28 are driven so that the forward strokes of their plungers 53 overlap, whereby the fused alloy is continuously supplied to the extrusion chamber 14. Also, a single constant displacement pump supplies the pressure fluid for the forward strokes of both plungers 53, whereby the sum of their forward stroke displacement rates is constant. Thus, the fused alloy is continuously supplied to the extruding chamber 14 and extruded therefrom at a constant rate.

The means for driving the extrusion pumps 28 comprises a pair of hydraulically actuated pistons 68 reciprocable in cylinders 69 carried upon the supporting frames 29, the plunger 53 of each pump being attached at its right end to one of the pistons. Referring to Fig. 4 which illustrates diagrammatically the hydraulic circuit for controlling and operating the pistons 68, which actuate the pumps 28, a pair of oil pumps are indicated at 70 and 71. The pumps 70 and 71 are preferably of the adjustable pressure and displacement type and may be of any suitable well known form capable of delivering a constant displacement of fluid at adjustable limiting pressures when operated at a constant R. P. M. Valves 74 and 75 are transfer or reversing valves having pistons 76 and 77, respectively, locked together as indicated at 78 and actuated by hydraulic pressure. The valve 74 serves to control the forward strokes of the plungers 53 of the extrusion pumps 28 and valve 75 controls the return strokes thereof. A mechanically actuated pilot valve 79 having a piston 80 controls the timing or reversal of the hydraulically actuated valves 74 and 75, the piston 80 being flexibly connected as indicated at 81 to the free end of a rocker arm 83 pivoted at a point 84 intermediate the pumps 27 to a bracket 85 (Fig. 1) extending between the pump frames 29 and attached thereto. Fixed to the underside of the rocker arm 83 is a bar 86, opposite ends of which are alternately engaged by adjustable screws or strikers 87, carried by the plungers 53, the engagement occurring only at the forward ends of the plunger strokes.

It will be apparent that means other than hydraulic power controlled by the mechanically actuated pilot valve 79 can be employed for actuating the timing or reversing valves 74 and 75. For instance, electrical solenoid actuated means controlled by contacts movable with the plungers 53 or leverage mechanism actuated by the movement of the plungers could be employed with equally good results.

Each of the extrusion pumps 28 is provided with means for packing the clearance which must be provided between each plunger 53 and a gland member 92 (Fig. 1) threaded into the associated cylinder 27 and which may be considered a portion thereof. This packing means in each instance comprises an annular recess 93 formed in the gland member 92, adapted to collect and retain the fused matter or alloy seeking to escape by way of the above mentioned clearance. The alloy so collected tends to revert to its solid state, but to insure such a change of state, an annular chamber 94 is provided in the gland member 92 into which a fluid coolant may be introduced by means comprising a plurality of nozzles 95 communicating with the chamber 94, the coolant being circulated through the chamber by means (not shown) connected to the nozzles. A fluid coolant so introduced into the chamber 94 will lower the temperature of any fused alloy collected in the annular recess 93 and cause it to solidify. The solidified alloy will then pack the extrusion pump 28.

The housing 20 surrounding the tubular extrusion block 13 (Figs. 1 and 2) is provided with an inner annular channel 96 which with the peripheral surface of the block forms a heating chamber 97 adapted to receive a heating medium, the chamber being disposed around the inlet end of the extrusion chamber 14 of the block 13. The heat from a gas burner may be utilized as the heating medium and circulated through the chamber by a blower, the burner and blower being associated with one of a pair of pipes 98 connected to opposite sides of the chamber 97. In Fig. 5 the burner and blower are illustrated diagrammatically. The housing 20 and the pipes 98 are insulated with a suitable heat retaining material 99, such as asbestos. This provides means whereby sufficient heat may be conducted from the chamber 97 through the wall of the block 13 and to the extrusion chamber 14 for preventing solidification of the fused alloy upon its entrance into the extrusion chamber and while passing therethrough until it reaches a point indicated by the broken lines 100 adjacent the extrusion point formed by the discharge opening 15 at the contracted left end of the extrusion chamber.

Formed in the die holder 41 which forms the left end wall of the extrusion chamber 14, is a plurality of circularly disposed recesses 101, two of which are shown in Fig. 1. Extending into each of the recesses 101 is a tube 102 which is smaller in diameter than that of the recess and spaced at its inner end from the end wall thereof, the tubes being secured to a cap member 103 fixed to the die holder 41. The outer ends of the tubes 102 communicate with an annular chamber 104 formed in the cap member 103 while the outer ends of the recesses communicate with an annular chamber 105 formed in the die holder 41 and the cap member, the tubes extending through the chamber 105. Communicating with the chambers 104 and 105 are pipes 106 and 107, respectively, the pipe 106 being connected to a supply source (not shown) of a suitable fluid coolant, whereby the coolant may be introduced into the chamber 104 circulated through the tubes 102, the recesses 101, the chamber 105 and passing out through an exhaust or return pipe 107.

It will be apparent that by the arrangement just described the coolant is supplied to the forward or extruding end only of the extruding chamber 14, and thus at all times, only a small portion of the alloy immediately adjacent the extruding point is in a solidified state. By controlling the temperature of the heating medium received by the chamber 97 and also that of the coolant entered into the die holder 41 a sufficient supply of alloy in its solid state in the form of a slug extending from the point 100 to the discharge opening 15 can be constantly stored in the annular extrusion chamber to avoid the possibility of any alloy passing out in its fused state through the discharge opening. By varying the temperatures of the fluid coolant and the heating medium the point 100 in the extrusion chamber 14 where the fused alloy reverts to a solidified state can be varied to maintain the slug continually being formed of minimum length and thus the pressure needed to displace the solidified alloy longitudinally in the extrusion chamber 14, through the discharge opening 15 and around the cable core 39 is reduced to a practicable minimum.

The operation of the herein described hydraulically actuated extrusion pumps 28, assuming that the oil pumps 70 and 71 have been individually adjusted or set to deliver a predetermined constant volume of fluid of the required limited pressure, is as follows:

In the position of the parts shown in Figs. 1 and 4 and referring particularly to Fig. 4, the left hand plunger 53 has just completed its upward or forward pumping stroke and has actuated the rocker arm 83 in a clockwise direction, thereby shifting the valve piston 80 of the pilot valve 79 from its extreme upper position, shown fragmentarily in dotted outline, into its extreme lower position as shown. In this position of the valve piston 80 low pressure from an auxiliary pump in the oil pump 71 is directed by a pipe 108 through a chamber 109 of the valve 79 and a pipe 110 to a chamber 111 of the transfer or reversing valve 74 which serves to shift its valve piston 76 and the valve piston 77 of the valve 75, which are locked together, from their extreme left position, shown fragmentarily in dotted outline, to their extreme right position as shown. In this last position of the valve pistons 76 and 77, high pressure fluid from the oil pump 70 is directed by a pipe 113 through a chamber 114 of the valve 74 and a pipe 115 to the lower end of the right cylinder 69, the piston 68 and plunger 53 of which have just completed their return stroke. Simultaneously with the direction of high pressure from the pump 70 to the lower end of the right cylinder 69, a suitable pressure from the pump 71 is directed by a pipe 116 through a chamber 117 of the valve 75 and a pipe 120 to the upper end of the left cylinder 69, the piston 68 and plunger 53 of which as hereinbefore described have just completed their forward or pumping stroke.

Upon this shifting of the valve pistons 80, 76 and 77 it will be apparent that the right and left plungers 53 will be moved upwardly and downwardly, respectively, as viewed in Fig. 4, the upward or forward stroke of the right plunger 53 pumping fused matter or alloy from the bore 51 of the associated extrusion pump into the extrusion chamber 14, through the discharge opening 15 and around the core 39 and the downward or return stroke of the left plunger drawing a charge of fused alloy from the supply (not shown) into the bore 51 of the associated extrusion pump 28 ready for the next forward pumping stroke of the plunger, all in the manner previously described. The exhaust oil from the upper end of the right cylinder 69 is returned to the sump of the pump 71 by way of a pipe 121, a chamber 122 of the valve 75 and a pipe 123 while the exhaust oil from the lower end of the left cylinder 69 is returned to the sump of the pump 70 by way of a pipe 124, a chamber 125 of the valve 74 and a pipe 126. The sumps of the pumps 70 and 71 are connected together by an oil level equalizing pipe 127.

At a predetermined point in the upward or forward stroke of the right plunger 53 the associated striker 87 acts upon the bar 86 attached to the rocker arm 83 and actuates the latter in a counter-clockwise direction to shift the valve piston 80 of the pilot valve 79 from the position shown in Fig. 4 to its extreme upper position, hereinbefore mentioned and indicated fragmentarily in dotted outline. This last position of the valve piston 80 causes low pressure from the pump 71 to be directed by the pipe 108, chamber 109 of the valve 79 and a pipe 130 to a chamber 131 of the valve 75 and the valve pistons 77 and 76 are then shifted from the position shown in Fig. 4 to their extreme left positions, hereinbefore mentioned and indicated fragmentarily in dotted outline. With this shifting of the valve pistons 77 and 76 high pressure from the pump 70 is now directed by the pipe 113, chamber 114 of the valve 74 and pipe 124 to the lower end of the left cylinder 69. Simultaneously with this transfer of the high pressure from the right to the left cylinder 69, pressure from the pump 71 is directed by the pipe 116, chamber 117 of the valve 75 and pipe 121 to the upper end of the right cylinder 69. Thus, the left and right plungers 53 will be moved upwardly and downwardly, respectively, as viewed in Fig. 4, and in an identical manner to that previously described in connection with their downward and upward movement, fused alloy will be pumped into the extrusion chamber 14 and drawn into the bore 51 of the right extrusion pump 28. In the continued operation of the apparatus the plungers 53 serve to continuously pump fused alloy into the extrusion chamber 14 and to draw fused alloy from the supply into the bores 51 of the extrusion pumps 28.

It is to be noted that the pipes 115 and 121 connected to opposite ends of the right cylinder 69 and the pipes 120 and 124 connected to opposite ends of the left cylinder 69 serve alternately as oil pressure supply pipes to the cylinders for moving the associated plungers 53 during their forward pumping and return strokes, respectively. Also, each pair of pipes connected to opposite ends of each cylinder serve alternately to direct the exhaust oil from the cylinders to the sumps of the associated pumps.

In an intermediate position (not shown) of the valve pistons 76 and 77 occurring during the period of shifting thereof to either their extreme left or right hand positions, the pump 70 which serves solely to supply high pressure oil for the forward strokes of the plungers will direct pressure oil by way of the pipe 113 and the chamber 114 of the valve 74 simultaneously through the pipes 124 and 115 into the lower ends of both cylinders 69. This results in an overlapping of the forward movement of both plungers 53 and for a period sufficient to insure that the extrusion chamber 14 is continuously supplied with fused alloy to be extruded. Furthermore, by moving both plungers 53 forwardly by the pressure fluid supplied by the single constant displacement pump 70, the sum of the forward stroke displacement rates of the plungers is constant and thus the fused alloy is supplied to the extruding chamber at a constant rate, or unvarying velocity.

During the period when both of the plungers 53 are moving forwardly the exhaust oil from the upper ends of the cylinders 69 is returned to the sump of the pump 71 by way of the pipes 120 and 121, the chambers 117 and 122 of the valve 75 and the pipe 123, the oil from the pump 71 being by-passed to the sump of the pump 71 through the chamber 117 and the pipe 123.

In the event that the matter or alloy to be extruded is solidified to such an extent that the limiting pressure for which the pump 70 is adjusted is insufficient to extrude it, then although the pumps 70 and 71 are maintained running at a constant speed, nevertheless no damage can result since the pumps are protected by internal safety valves.

In Fig. 5 there is shown diagrammatically a mechanism responsive to the extruding pressure for controlling the condition of the alloy within the extruding chamber by regulating the heating and cooling mediums supplied thereto. This mechanism is responsive directly to the pressure of the oil in the pipe 113 which directs high pressure oil from the pump 70 to the cylinders 69 for the forward pumping strokes of the plungers 53. At higher temperatures in the extrusion chamber 14 it will be obvious that the fused alloy will offer less resistance to extrusion and conversely with a lower temperature in the chamber the fused alloy will offer greater resistance to extrusion. These conditions in the chamber 14 will consequently result in lesser or greater pressures, respectively, in the high pressure pipe 113 and this varying pressure therein is used to predeterminedly control the heating medium supplied to the chamber 14 and the coolant supplied to the die holder 41 so that the alloy in the extruding chamber 14 is maintained in a fused state until very near the extruding point, whereby the extruding pressure is reduced to a practicable minimum.

Referring particularly to Fig. 5, the pipe 113 which directs high pressure oil from the pump 70, has connected thereto, at a point in advance of its connection to the valve 74, a pipe 140 which constantly directs the high pressure oil to an adjustable spring loaded diaphragm 141. A plunger 142 of the diaphragm is pivotally connected to one end of a pivoted bar 143 arranged to alternately make and break a circuit controlled by spring contacts 144. The spring contacts 144 are included in one side of a suitable source of electrical power (not shown) which is connected to line wires 145 and 146, respectively. Connected in parallel to the line wires 145 and 146 are solenoids 147 and 148, the cores of which are connected to stems of spring loaded slide valves 151 and 152, respectively. The valve 151 controls the volume of gas directed to a burner 150, which includes a pilot light, associated with the inlet pipe 98 of the heating chamber 97 surrounding the extrusion block 13, a blower being indicated at 153 for circulating the heat from the gas burner around the heating chamber 97 and through the exhaust pipe 98 arranged opposite the inlet pipe. The valve 152 controls the volume of fluid coolant directed to the die holder 41 by the pipe 106, the coolant being circulated through the die holder in the manner hereinbefore described. A throttle valve 154 is included in a pipe 156, connecting the gas slide valve 151 and the burner 150, and a throttle valve 155 is provided in the pipe 106 connecting the coolant slide valve 152 and the die holder 41 for controlling the volume of gas and coolant being directed to the burner and die holder, respectively.

The valves 154 and 155 are initially adjusted to permit the passage therethrough of a sufficient volume of gas and coolant, respectively, to provide the desired temperature condition in the extrusion chamber 14. The spring of the diaphragm 141 is also adjusted so that the plunger 142 is urged downwardly but not with a force great enough to overcome the high pressure in the pipe 140 which normally actuates the diaphragm to hold the plunger 142 in its upper position. Consequently, the bar 143 will hold the spring contacts 144 engaged, thus holding closed an electrical circuit through the line wires 145 and 146 to the solenoids 147 and 148. When the valve 151 is opened the valve 152 is closed and vice versa.

In the operation of the extruding apparatus, if the pressure in the pipe 140 drops due to a reduction of the pressure in the extrusion chamber 14 caused by too high a temperature in the chamber the diaphragm plunger 142 will move downwardly permitting the engagement between the spring contacts 144 to be broken and thus opening the energizing circuits through the solenoids 147 and 148 and consequently closing the gas valve 151 and opening the fluid coolant valve 152. This will cause the temperature in the chamber 14 to be lowered and due to the greater resistance to extrusion of the alloy, the temperature of which has also been lowered, the pressure in the pipe 140 will rise and the diaphragm plunger 142 will be moved upwardly resulting in the closing of the circuits to the solenoids 147 and 148. The solenoids 147 and 148 are thus energized causing the fluid coolant valve 152 to be closed and the gas valve 151 to be opened and thereafter whenever the pressure in the extrusion chamber 14 drops or rises an appreciable amount from a predetermined pressure the control circuit will automatically serve to correct this condition. Thus, the possibility of any alloy passing in its fused state from the extrusion chamber 14 is prevented and the pressure needed to extrude the comparatively small slug continually being formed at the extruding end of the chamber is maintained at a practicable minimum.

In an alternative form of temperature control mechanism, illustrated fragmentarily in Fig. 6, the volume of gas directed to the burner 150 and the volume of fluid coolant directed to the die holder 41 are simultaneously gradually varied in accordance with pressure variations in the high pressure oil pipe 140, as distinguished from the intermittent completely on or off method described hereinbefore in connection with Fig. 5.

Referring to Fig. 6, an adjustable spring loaded diaphragm 160 is in communication with the high pressure oil pipe 140. A plunger 161 of the diaphragm is pivotally connected to one end of a lever 162 fulcrumed at 163, the opposite end of the lever being pivoted to the stems of oppositely arranged spring loaded slide valves 164 and 165 for controlling the volume of gas and coolant directed by the pipes 156 and 106 to the burner 150 and the die holder 41, respectively. The valves 164 and 165 are adapted to control the gas and coolant reversely, that is, when the gas volume is diminished the coolant volume is increased and vice versa. With this arrangement due to the leverage transmitted through the lever 162 to the stems of the valves 164 and 165 from the movement of the diaphragm plunger 161, when the pressure in the pipe 140 varies from a predetermined desired pressure, a gradual change either more or less, in the volume of gas passing through the valve 164 to the burner 150 is effected and simultaneously therewith a gradual change, either less or more, in the volume of coolant passing through the valve 165 is effected. This causes a corresponding change in the temperature in the extrusion chamber 14, which temperature determines the extruding pressure required.

In the temperature control mechanisms shown in Figs. 5 and 6 both the gas and coolant volumes supplied to the extrusion head 11 are responsive to variations in the extruding pressure, but it is obvious that either the gas or coolant volume might singly be controlled or regulated from the extruding pressure by the same general type of mechanisms with the volume of the other medium predeterminedly fixed.

In the present embodiment of the invention, the pressure control mechanisms shown in Figs.

5 and 6 are controlled from the pressure in the high pressure oil pipe 113, but it will be apparent that the control could be effected directly from the pressure in the extrusion chamber 14 when the matter or alloy being extruded requires a comparatively low extrusion pressure.

It is believed that the operation of the apparatus will be clearly understood from the above detailed description. Briefly, the operation is as follows: The fused alloy is continuously supplied to the extruding chamber 14 at a constant rate by the hydraulically actuated extrusion pumps 28 in the manner hereinbefore described. During the movement of the fused alloy from the inlet end of the extruding chamber 14 to the discharge opening 15 thereof, effected by the continuous introduction of fused matter into the chamber, the alloy is maintained in a fused state until very near the extrusion point by the heating medium supplied to the extrusion head 11, a comparatively small slug of the alloy being continually formed adjacent the extrusion point by the introduction of a coolant into the head solely at this point. The slug so formed is continuously extruded at a constant rate, or unvarying velocity by the continuous introduction of fused alloy into the chamber. The temperature of the alloy within the extrusion chamber is accurately controlled through the regulation of the heating and cooling mediums by the mechanism hereinbefore described, which is responsive directly to the pressure of the oil in the pipe 113 directing high pressure oil from the pump 78 to the hydraulically actuated extrusion pumps 28.

Although the invention, as herein illustrated and described, is particularly applicable to the forming of a lead alloy sheath around cable cores, it should be understood that the hydraulic system for driving the piston type pumps and the other novel features of the invention are capable of various other applications within the scope of the appended claims.

What is claimed is:

1. In an extruding apparatus, an extruding chamber, a plurality of piston type pumps for supplying said chamber with matter to be extruded therefrom, and constant volume fluid pressure means for driving the pistons of said pumps, comprising means controlling the application of force to said pistons in such a manner that the sum of their displacement rates is constant.

2. In an extruding apparatus, an extruding chamber, a plurality of piston type pumps for supplying said chamber with matter to be extruded therefrom, means for supplying a pressure fluid to said pumps at a constant rate for moving the pistons of the pumps in one direction in succession with overlapping strokes, and means for controlling said pressure fluid so that the sum of the speeds of the pistons in said direction is constant.

3. In combination, a chamber having a discharge opening, a plurality of piston type pumps for forcing matter into the chamber and through the discharge opening, and constant volume fluid pressure means for driving the pistons of the pumps, comprising means controlling the application of force to said pistons in such a manner that the sum of their displacement rates is constant.

4. In an extruding apparatus, an extruding chamber, a plurality of extruding cylinders for supplying said chamber with matter to be extruded therefrom, an extruding plunger for each cylinder pressure fluid actuated means individual to each plunger for moving the plungers in succession with overlapping strokes, and means for controlling the pressure fluid actuated means so that the sum of the displacement rates of the plungers is constant.

5. In an extruding apparatus, an extruding chamber, a pair of extruding cylinders for continuously supplying said chamber with matter to be extruded therefrom, an extruding plunger for each cylinder, pressure fluid actuated means individual to each plunger for moving the plunger so that their forward strokes overlap, and a single constant displacement pump for supplying the pressure fluid for the forward strokes of the plungers so that the sum of their displacement rates is constant.

6. In an extruding apparatus, an extruding chamber, means for continuously supplying the chamber with matter to be extruded comprising a plurality of pump cylinders communicating with the chamber, a plunger for each cylinder, a pressure fluid system, including fluid actuated means individual to each plunger for reciprocating them, valve mechanism for directing the pressure fluid simultaneously and then individually to the cylinders for driving the plungers with their forward pumping strokes overlapping, means responsive to the movements of the plungers for actuating the valve mechanism, and a single constant displacement pump communicating with the valve mechanism for furnishing pressure fluid for the forward pumping strokes of the plungers.

7. In an extruding apparatus, an extruding chamber, means for continuously supplying the chamber with matter to be extruded comprising a pair of pump cylinders communicating with the chamber, a plunger for each cylinder, and a pressure fluid system, including a cylinder individual to each plunger, a piston operating in said cylinder and connected to said plunger, means for directing pressure fluid to said cylinders for driving said pistons and thereby the plungers with their forward pumping strokes overlapping, and a single constant displacement pump communicating with said directing means for furnishing pressure fluid for the forward pumping strokes of the plungers.

8. In an extruding apparatus, an extruding chamber, means communicating with the chamber for supplying the chamber with matter to be extruded comprising a pump cylinder having inlet and discharge ports, the inner ends of the ports disposed substantially parallel to the axis of the cylinder bore and within its circumference, the outer end of the discharge port being arranged coincident with the axis of the cylinder bore and the outer end of the inlet port arranged at an angle thereto, valves associated with the ports for preventing back flow of the matter from and into the cylinder bore, a plunger for each cylinder bore, and means for reciprocating the plunger.

9. In an extruding apparatus, a block having an extruding chamber therein and an inlet aperture for the chamber at its rear end, an outwardly extending shoulder portion on the block at its forward end, means for supplying the chamber with matter to be extruded, and means for supporting the matter supplying means in communicating alinement with the inlet aperture, comprising a plurality of cooperating means surrounding the block, one of said cooperating means having an end portion abutting the rear end wall of the block, means for securing the matter supplying means to said end portion, another of said cooperating means abutting a rear surface of said shoulder portion and shrunk over the forward end of the block, and means for securing the cooperating means together.

10. In an extruding apparatus, a cylinder having an extruding chamber therein and an inlet aperture for the chamber at its rear end, a circumferential flange on the cylinder at its forward end, means for supplying the chamber with matter to be extruded, means for supporting the matter supplying means in communicating alinement with the inlet aperture comprising a housing surrounding the cylinder with its forward end longitudinally spaced from a rear annular surface of said flange and having a rear wall abutting the rear end wall of the cylinder, an annular member surrounding said flange in abutting relation with the rear annular surface thereof and shrunk over the forward end of the cylinder, means for securing the housing and annular member together, and means for securing the matter supplying means to the housing.

11. In an extruding apparatus, a block having an extruding chamber therein and an inlet aperture for the chamber at its rear end, an outwardly extending shoulder portion on the block at its forward end, means for supplying the chamber with matter to be extruded, and means for supporting the matter supplying means in communicating alinement with the inlet aperture, comprising a plurality of cooperating means surrounding the block, one of said cooperating means having an end portion abutting the rear end wall of the block and provided with an inner channel cooperating with the outer surface of the block to provide a heating chamber for the extruding chamber, means for securing the matter supplying means to said end portion, another of said cooperating means abutting a rear surface of said shoulder portion and shrunk over the forward end of the block, and means for securing the cooperating means together.

12. In an extruding apparatus, an extruding chamber having an extrusion aperture at one end and a plurality of inlet apertures at the opposite end, means communicating with the inlet apertures for supplying the chamber with fused matter to be extruded, means for maintaining in a solidified condition a small portion of the matter adjacent the extrusion aperture, and means disposed in the chamber spaced from the inlet apertures and in the path of matter being directed therefrom for diffusing the incoming matter around the chamber for causing it to move uniformly toward the extrusion aperture, thereby preventing the formation of irregularities in the end of said solidified portion.

13. In an extruding apparatus, an extruding chamber having an extruding aperture, means for supplying said chamber with fused matter to be extruded, pressure fluid actuated means including a pressure fluid line for applying a predetermined pressure to the matter in the chamber to extrude it therefrom, and means operatively associated with said line and responsive to variations in the pressure therein for varying the temperature of the matter within said chamber.

14. In an extruding apparatus, an extruding chamber having an extruding aperture, means for supplying said chamber with fused matter to be extruded, means for subjecting the fused matter in a portion of said chamber to heat to maintain it in a fused state, means for subjecting the fused matter in another portion of said chamber to a cooling medium to cause the solidification of said portion, pressure fluid actuated means including a pressure fluid line for extruding the solidified matter through the aperture by the introduction under a predetermined pressure of fused matter into said chamber, and means operatively associated with said line and responsive to variations in the pressure therein for regulating the heating and cooling of the matter in said chamber.

15. In an extruding apparatus, an extruding chamber, means communicating with the chamber for supplying the chamber with matter to be extruded comprising a pump having a plunger, a cylinder formed with a bore having a diameter to fit said plunger, said cylinder having inlet and discharge ports, the inner ends of the ports disposed substantially parallel to the axis of the cylinder bore and substantially within its circumference, and valves associated with the ports for preventing back flow of the matter from and into the cylinder bore respectively.

16. In an extruding apparatus, an extruding chamber having an extruding aperture, means for supplying said chamber with fused matter to be extruded, pressure fluid actuated means including a pressure fluid line for applying a predetermined pressure to the matter in the chamber to extrude it therefrom, and means including a pressure fluid actuated element communicating with said line responsive to variations in the pressure therein caused by variations in the condition of the matter within said chamber for varying the temperature of the matter within said chamber.

17. In an extruding apparatus, an extruding chamber having an extruding aperture, means for supplying said chamber with fused matter to be extruded, pressure fluid actuated means including a pressure fluid line for applying a predetermined pressure to the matter in the chamber to extrude it therefrom, and means including a pressure fluid actuated element communicating with said line and an electrical circuit controlled by said element responsive to variations in the condition of the matter within said chamber for varying the temperature of the matter within said chamber.

18. In an extruding apparatus, an extrusion chamber, a pair of extrusion cylinders communicating with said chamber, an extrusion piston in each of said cylinders, a fluid actuated motor for reciprocating each of said extrusion pistons, said motors each comprising a cylinder in longitudinal alignment with an extrusion cylinder and a motor piston for actuating the extrusion piston, means for delivering a constant volume of fluid to said motor pistons and control means operative when one of said motor pistons, approaches the end of its forward stroke for supplying said fluid to both of said motor pistons to move said motor pistons forwardly at such speeds that the sum of the rates of movement is equal to the normal rate of movement of either piston in the forward direction until said piston completes its forward stroke, at which instant said control means operates to supply said fluid to the other piston to move it forwardly at its normal constant rate.

EINER W. LARSEN.